United States Patent [19]

Benchea

[11] Patent Number: 5,599,409
[45] Date of Patent: Feb. 4, 1997

[54] RADIAL TIRE/WHEEL ASSEMBLY FOR HIGH BRAKE HEAT GENERATED SERVICE

[75] Inventor: Traian Benchea, Brentwood, Tenn.

[73] Assignee: Bridgestone/Firestone, Inc., Akron, Ohio

[21] Appl. No.: 502,439

[22] Filed: Jul. 14, 1995

[51] Int. Cl.⁶ .............................. B60C 3/00; B60C 3/04; B60C 5/00
[52] U.S. Cl. ................ 152/454; 152/151; 152/153; 152/539; 152/375; 301/6.91
[58] Field of Search ...................... 152/459, 539, 152/560, 153, 151, 375, DIG. 20; 301/6.91, 6.3

[56] References Cited

U.S. PATENT DOCUMENTS

| | | |
|---|---|---|
| 3,515,196 | 6/1970 | Floria . |
| 4,082,132 | 4/1978 | Arai et al. . |
| 4,408,648 | 10/1983 | Ohashi ................... 152/454 |
| 4,811,771 | 3/1989 | Shoemaker et al. . |
| 4,836,260 | 6/1989 | Corner et al. . |
| 4,915,151 | 4/1990 | Sato et al. ................. 152/454 |
| 5,131,446 | 7/1992 | Fukumoto et al. . |
| 5,137,069 | 8/1992 | Baker et al. . |
| 5,353,856 | 10/1994 | Kishi et al. . |
| 5,360,047 | 11/1994 | Fujiwara .................. 152/454 |

Primary Examiner—Adrienne C. Johnstone
Attorney, Agent, or Firm—Carmen S. Santa Maria

[57] ABSTRACT

A vehicle tire and wheel assembly for use in high brake heat generated service has an overall tire diameter (TD) of approximately 43 inches and an overall wheel diameter (WD) of approximately 24.5 inches to provide a ratio of approximately 1.76. The tire section height (H) is approximately 9.2 inches and the tire section width (W) is approximately 11.5 inches. The tire is of a radial construction containing steel reinforcing cords.

4 Claims, 2 Drawing Sheets

3,599,409

RADIAL TIRE/WHEEL ASSEMBLY FOR HIGH BRAKE HEAT GENERATED SERVICE

BACKGROUND OF THE INVENTION

1. Technical Field

The invention relates to pneumatic tires, and, in particular, to a tire/wheel assembly for use in high brake heat generated service, such as buses used for mass transit, wherein the constant braking generates excessive heat, which can cause destruction of the tire bead interface. More particularly, the invention relates to such a tire/wheel assembly which enables a radial tire to be utilized on a larger diameter rim without increasing the overall height of the tire to provide lower heat generation in the area of the tire bead.

2. Background Information

Heat generated by the brakes of transit buses in city service through radiation, convection and conduction, results in high temperatures adjacent the bead area. This heat affects the bead area and lower sidewall of the tire and may cause ultimate tire breakdown, especially in radial tires which use steel-reinforced body plies. It is desirable to use radial tires for such vehicles, since the metal cords used as the reinforcing material in the belt provide excellent wear characteristics and puncture resistance under service conditions. However, as indicated above, the closeness of the bead area to the vehicle brakes causes excess heat generation in the bead area, possibly causing tire breakdown.

This heat generation problem can be reduced by increasing the size of the vehicle wheel or rim, thereby moving the tire bead further away from the heat-generating brake area. However, increasing the size of the wheel or rim will increase the overall size and height of the tire/wheel assembly. Such increase is unacceptable for many vehicles, such as those used in mass transit, where the height of the vehicle step is regulated by federal law and must be maintained. Therefore, just increasing the size of the wheel to reduce this heat generation problem is unacceptable due to the overall height increase of the tire/wheel assembly.

U.S. Pat. No. 4,082,132 discloses a radial tire for use with mass transit vehicles, which recognizes this heat generation problem and attempts to solve the same by a unique tire construction, and, in particular, a unique tread.

U.S. Pat. No. 5,137,069 discloses a new tire construction which desires to maintain the same tread width for use in drag racing but changes the cross-sectional configuration of the tire and the size of the rim or wheel.

U.S. Pat. No. 3,515,196 discloses a tire/wheel assembly which increases the wheel diameter without increasing the total diameter of the wheel and tire combination by providing the distance between the axial outer surfaces of the heel portions of the bead not less than 90% of the transverse sectional width of the tire, and wherein the sectional height of the tire is not greater than 77.5% of the sectional width of the tire.

U.S. Pat. No. 4,836,260 discloses a new rim or wheel configuration which provides increased brake space for a pneumatic tire without affecting the tire or its mounting thereon.

U.S. Pat. No. 5,131,446 discloses a pneumatic radial tire for heavy loads, such as trucks and buses, which avoids or reduces structural failure between the carcass and bead by a particular belt/ply arrangement.

U.S. Pat. No. 5,353,856 discloses a pneumatic radial tire which increases the durability of the belt layer without causing a decrease in the other characteristics of the tire when used for heavy-duty use by providing a modified tread area.

Although these prior art tires and tire/wheel combinations may achieve their intended purpose, there still exists a need for an improved vehicle tire and tire/wheel combination which enables a radial tire to be used for high brake heat generated service, such as mass transit buses, which achieves the effect by moving the tire bead further from the brake area without increasing the overall diameter of the tire/wheel assembly.

SUMMARY OF THE INVENTION

Objectives of the invention include providing an improved pneumatic radial tire, individually and in combination with a wheel, which provides better resistance to heat created by constant braking of the vehicle, to retard or reduce breakdown of the lower sidewall and bead area by reducing the temperature occurring therein.

Another objective of the invention is to provide such a vehicle tire and tire/wheel combination which enables a larger diameter wheel to be utilized without increasing the overall diameter of the tire/wheel assembly by providing a particular tire configuration which maintains the same tire section width but changes the aspect ratio by modification of the tire section height, and which maintains the same bead spacing while increasing the bead diameter for mounting on the increased diameter wheel or rim.

Still another objective of the invention is to enable the improved tire to be mounted on an existing modified 24.5 inch wheel, thereby avoiding construction and designing of a different wheel.

A further objective of the invention is to provide such an improved tire having a section width of approximately 11.5 inches and a section height of approximately 9.2 inches, with a bead spacing of approximately 8.25 inches.

Still another objective of the invention is to provide such a vehicle tire which is a radial tire having a plurality of steel reinforcing belts in the body ply to provide increased wear characteristics and increased puncture resistance.

These objectives and advantages are obtained by the improved vehicle tire and wheel combination of the present invention, the general nature of which may be stated as including a tire having a ratio of the overall tire diameter (TD) to the overall wheel diameter (WD) of approximately 1.76, wherein the overall tire diameter is approximately 43 inches and the overall wheel diameter is approximately 24.5 inches, in which the aspect ratio of the tire is approximately 80%, and in which the ratio of the bead diameter to the bead spacing is approximately 3.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
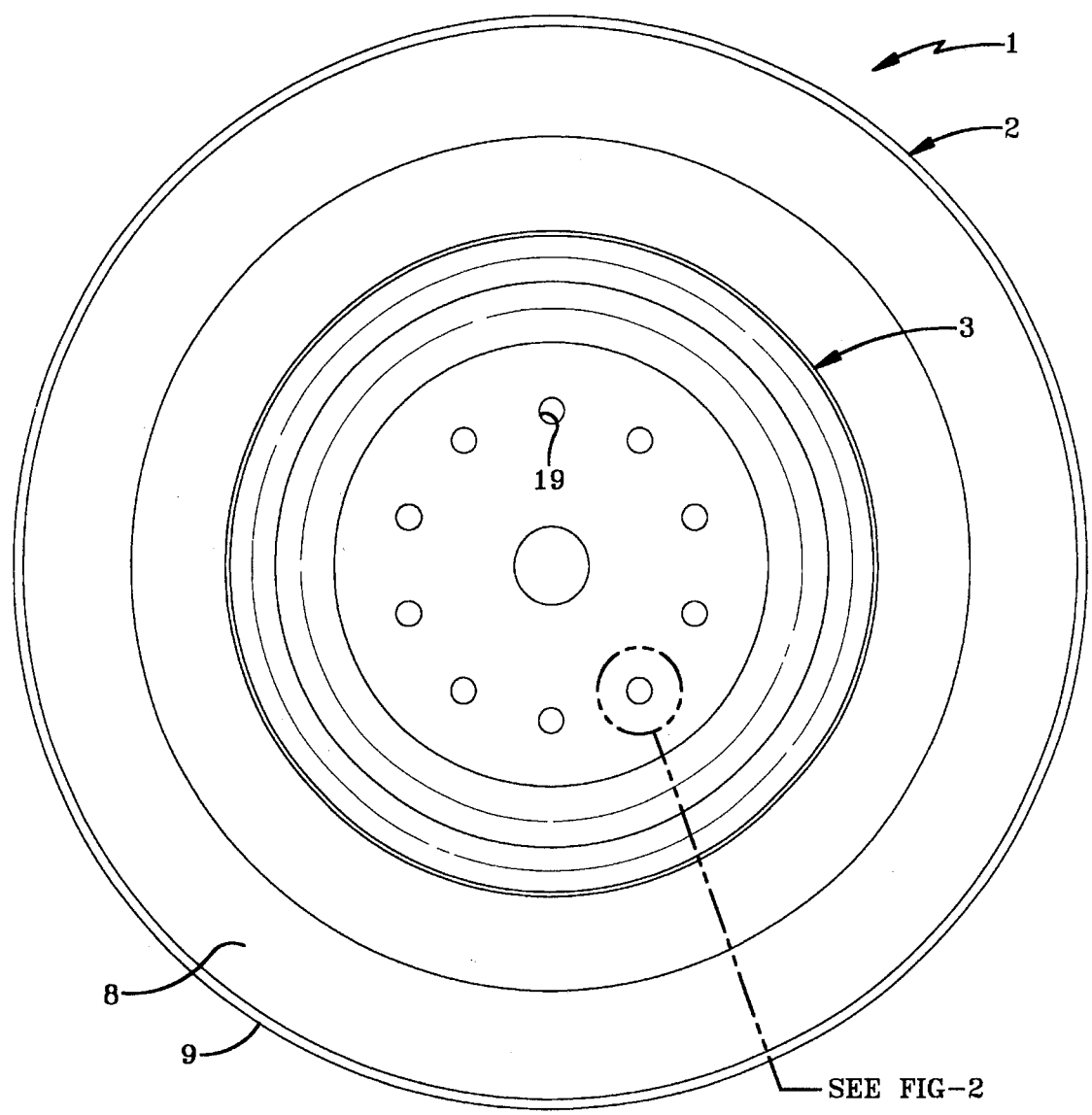
FIG. 1 is a generally diagrammatic side elevational view of the improved vehicle tire and wheel combination.

FIG. 1 is a diagrammatic side elevational view of the improved vehicle tire and wheel combination of the present invention, indicated generally at 1. This combination includes a unique tire, indicated generally at 2, and modified rim or wheel, indicated generally at 3. Tire 2 and a portion of wheel 3 are shown in cross section in FIG. 3, which shows the relationship to the prior art tire and wheel combination, indicated generally at 5, and shown in FIG. 4.

Tire 2 is a pneumatic tire which will have a usual fluid-impervious innerliner 6 and various carcass plies, including one or more steel belts 7 arranged in a radial fashion, in combination with the tire sidewalls 8 and tread 9. A usual pair of annular beads 11 will be contained within a bead area 12 having its usual bead filler (not shown), abrasion strip and other components found in most pneumatic tires.

Figure 4:
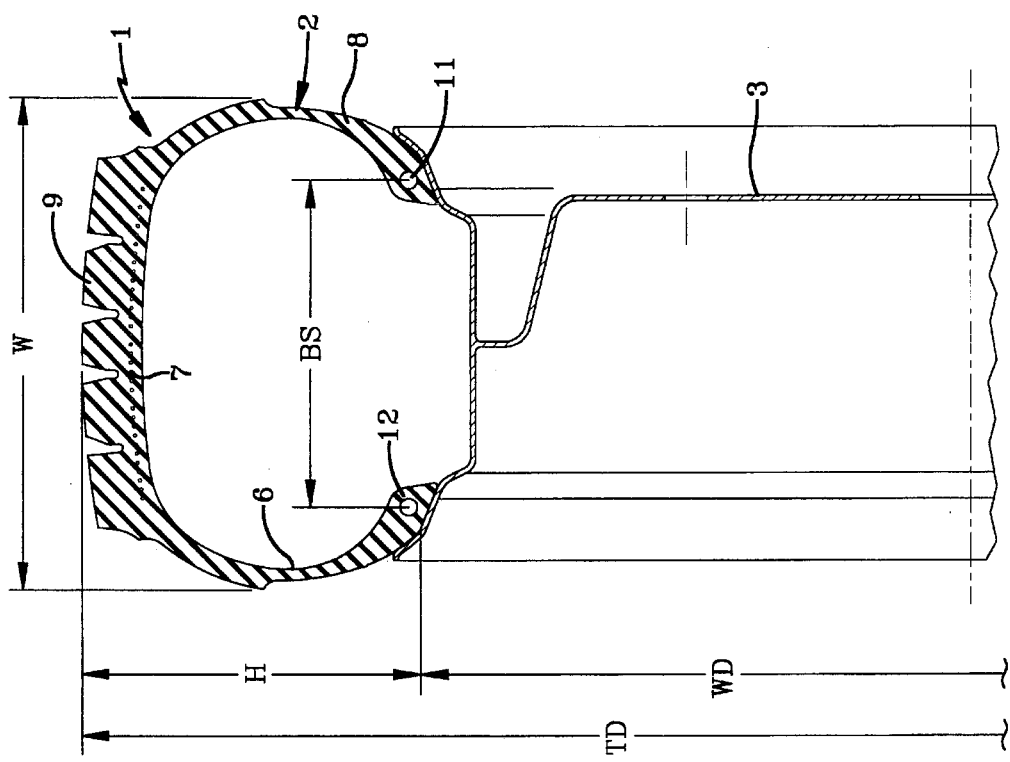
FIG. 4 is a sectional view similar to FIG. 3 showing the prior art tire and wheel combination, of which the present invention is an improvement thereon.

Refer initially to the prior art tire/wheel combination 5, shown in FIG. 4, which is presently used for mass transit vehicles. Tire/wheel assembly 5 includes a tire 15 which has a section width (W) of approximately 11.5 inches, and a section height (H) of approximately 10.8 inches. This provides an aspect ratio, section height divided by section width or (H/W) of approximately 94%. The overall tire diameter has a nominal rating of approximately 43 inches, and has a designation of 285/80R24.5. The wheel diameter (WD) is approximately 22.5 inches, and bead spacing (BS) is 8.25 inches.

Figure 3:
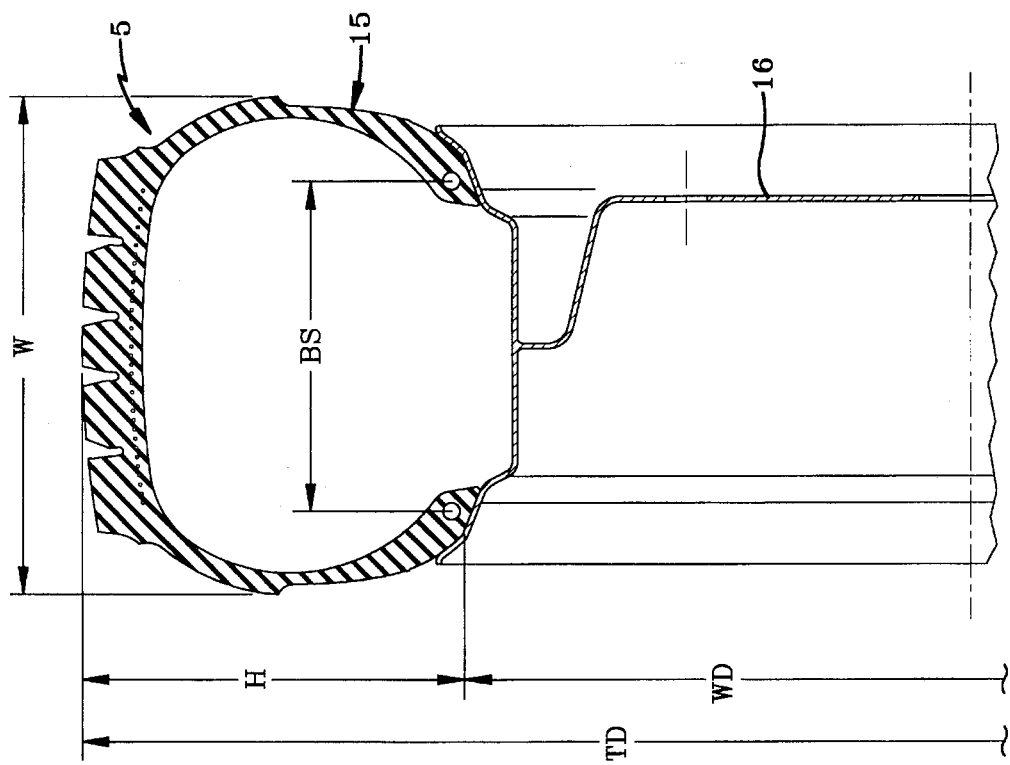
FIG. 3 is a cross sectional view of the vehicle tire and a portion of the wheel of the present invention.

The unique tire construction and tire and wheel combination of the present invention is shown in FIG. 3. In tire 2, the diameter (TD) is maintained at a nominal dimension of between 42 and 43 inches, and the tire section width (W) is maintained at approximately 11.5 inches. Furthermore, a bead spacing (BS) of 8.25 inches is in maintained, as in prior art tire 15. However, in accordance with the invention, the section height (H) is decreased to approximately 9.2 inches to provide an aspect ratio of H/W of approximately 80%, in comparison to the heretofore 94% aspect ratio of prior art tire 15.

In accordance with another of the main features of the invention, the wheel diameter (WD) of wheel 3 is increased to approximately 24.5 inches, providing an increase of 2 inches over wheel 16 of prior art tire/wheel assembly 5, thereby providing an approximate 1-inch increase in spacing between the brake drum (not shown) and the tire bead/wheel interface. Tests have shown that this increase in spacing provides for a reduced temperature in the bead area of between 30° F. and 60° F. This temperature reduction enables a radial tire having the steel reinforcing belts 7 therein to be utilized without increasing the danger of tire separation at the bead/body ply interface, eliminating the need of using biased tires having non-metallic reinforcing cords to reduce heat transfer.

Thus, comparing improved vehicle tire/wheel assembly 1 with respect to the prior art vehicle tire/wheel assembly 5 (FIG. 4), tire 2 will have an aspect ratio of 80% in comparison to the aspect ratio of 94% of tire 15, while maintaining the same tire section width (W) of approximately 11.5 inches, and a bead spacing (BS) of 8.25 inches, the same as in prior art tire 15. This enables a conventional 24.5-inch rim, presently used for other applications, to be utilized for the mounting of tire 2 thereon.

Figure 2:
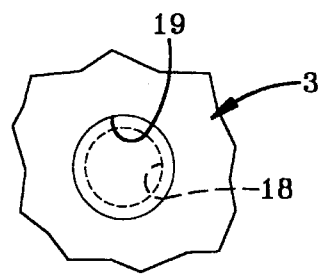
FIG. 2 is an enlarged fragmentary view of the encircled portion of FIG. 1.

Presently, there is no known 24.5-inch wheel or rim which is used for heavy-duty vehicles, such as mass transit buses. Therefore, it has been found that a conventional 24.5-inch wheel used for other applications can be modified to match the wheel studs on a transit bus hub on an existing 8.25×24.5 modified wheel, by increasing the size of the stud mounting holes 18, as shown in dot-dash lines in FIG. 2, from a diameter of 1.08 inches to a larger diameter of 1.20 inches, as shown by solid line 19. This slight modification and enlargement of the stud-receiving holes on an existing 8.25×24.5 wheel, enables modified tire 2 to be utilized with modified wheel 3 for mounting on the studs of most existing transit buses.

Accordingly, the improved tire and tire/wheel assembly enables a radial tire having steel reinforcing belts to be used for mass transit applications on a larger diameter ring than heretofore possible, to achieve increased spacing between the brake drum and tire bead area, to reduce the heat which accumulates in the tire bead area, to prevent premature separation of the bead from the tire carcass without increasing the overall height of the tire/wheel assembly.

Accordingly, the improved radial tire and tire/wheel assembly of the present invention is simplified, provides an effective, safe, inexpensive, and efficient combination which achieves all the enumerated objectives, provides for eliminating difficulties encountered with prior tire/wheel assemblies, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved radial tire and tire/wheel assembly is constructed and used, the characteristics of the construction, and the advantageous, new and useful results obtained; the new and useful structures, devices, elements, arrangements, parts and combinations, are set forth in the appended claims.

I claim:

1. A vehicle tire and wheel combination wherein the tire ratio of the overall tire diameter (TD) to the overall wheel diameter (WD) is approximately 1.76, said overall tire diameter (TD) being approximately 43 inches and the overall wheel diameter (WD) being approximately 24.5 inches.

2. The vehicle tire and wheel combination of claim 1 wherein the tire section width (W) is approximately 11.5 inches, and the tire section height (H) is approximately 9.2 inches.

3. The vehicle tire and wheel combination of claim 1 wherein the bead spacing (BS) of the tire is approximately 8.25 inches.

4. The vehicle tire and wheel combination of claim 1 where the tire is a radial tire.

\* \* \* \* \*